Sept. 28, 1965  O. G. BURCH  3,208,841
APPARATUS FOR MELTING GLASS
Original Filed Oct. 1, 1954  5 Sheets-Sheet 1

INVENTOR.
OSCAR G. BURCH
BY
ATTORNEY

INVENTOR.
OSCAR G. BURCH
BY J. R. Nelson
ATTORNEY

Sept. 28, 1965     O. G. BURCH     3,208,841
APPARATUS FOR MELTING GLASS
Original Filed Oct. 1, 1954     5 Sheets-Sheet 4
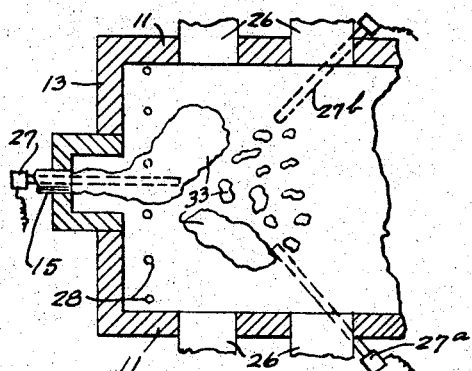
FIG. 9.
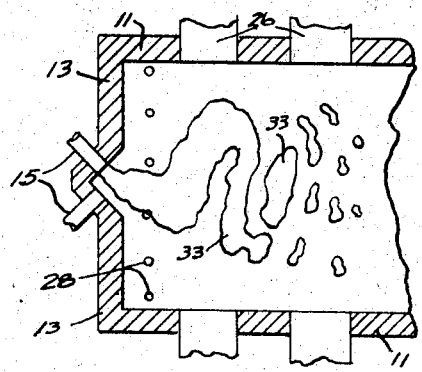
FIG. 10.
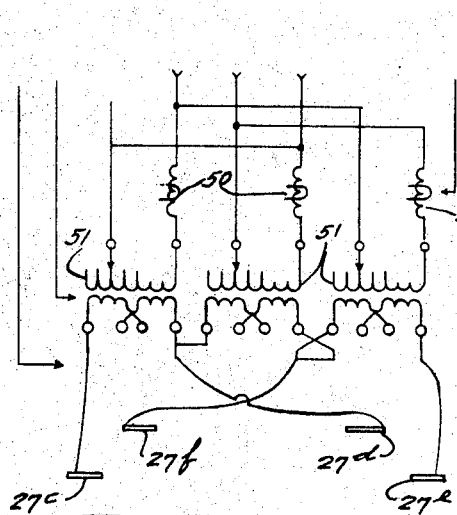
FIG. 11.
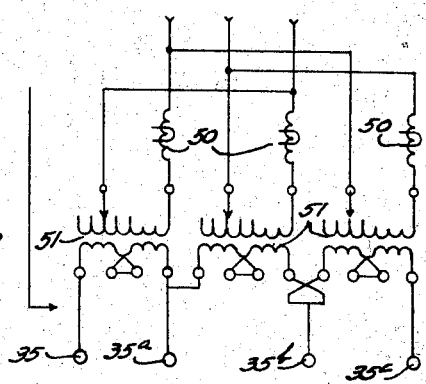
FIG. 12.
FIG. 13
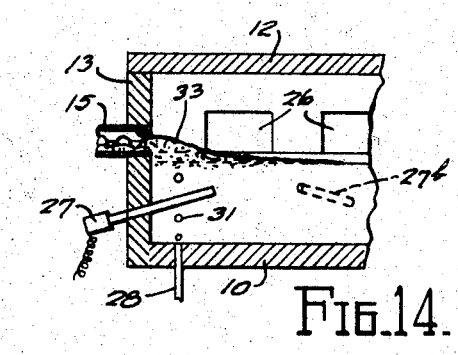
FIG. 14.
INVENTOR.
OSCAR G. BURCH
BY
J. R. Nelson
ATTORNEY INVENTOR
OSCAR G. BURCH
BY J. R. Nelson
ATTORNEY

United States Patent Office 3,208,841
Patented Sept. 28, 1965

3,208,841
APPARATUS FOR MELTING GLASS
Oscar G. Burch, Toledo, Ohio, assignor to Owens-Illinois Glass Company, a corporation of Ohio
Application Feb. 27, 1959, Ser. No. 796,176, now Patent No. 2,975,224, dated Mar. 14, 1961, which is a continuation of application Ser. No. 459,588, Oct. 1, 1954. Divided and this application Oct. 6, 1960, Ser. No. 60,895
2 Claims. (Cl. 65—179)

The present application is a division of my co-pending application Ser. No. 796,176, filed February 27, 1959, which issued as Patent No. 2,975,224, and which was a continuation of my earlier filed application Ser. No. 459,588, filed October 1, 1954, now abandoned.

The primary purpose of this invention is to provide an increase in the productive capacity of a glass melting tank together with an increased quality of the glass produced. This increase is to be accomplished by combining the action of two different heat sources, i.e., one being electrical and the other combustible fuel, used particularly in the melting of the glass, with the mechanical stirring action provided by a gaseous agent, such as air or inert gas passing in bubble form upwardly through the melting glass batch.

In this invention it is contemplated to provide a furnace or tank having interconnected glass containing compartments separated from each other by walls which are either submerged or otherwise, but each having a connection with its adjacent portion by which molten glass may pass from one to the other.

Also provided is means for feeding the raw batch materials into one end or one or both sides of the melting portion, either in stream, lump or blanket form, and further means is provided in said portion for stirring the glass both by mechanical and convection current action.

In connection with the latter-mentioned feature, it is contemplated by the present invention that stirring of the glass solely by mechanical means disclosed herein will contribute greatly toward the melting efficiency of the furnace, whether such furnace be heated solely by combustible gases or by the combination of combustible gases and electrical energy.

In the usual glass melting furnace, for example, one having a melting and refining area, with said melting area being of several hundred square feet, provided with reversing side or end port checker firing, it is found that it will produce certain colors of molten glass on a basis of approximately one ton per six square feet of melter area.

The simple addition of a submerged dam before the throat or passage leading from the melter, will provide a condition whereby such a furnace or tank, will produce molten glass on a basis of a ton of glass per several square feet of melter area.

The addition of certain electrical equipment to this same furnace will permit production of molten glass on a considerably smaller number of square feet of melter area and by adding bubblers, the square feet of melter area required per ton of glass produced is still further reduced. These increases of tons per square foot indicate an increase of productive capacity of approximately 35%, and actual production records indicate a considerable lowering percentage wise of off ware due to bad glass even with the increased tonnage production.

Among the objects of this invention, it is desired to provide a novel method and means for facilitating the melting and refining operations in a glass melting tank by producing a direction controlled and accelerated circulation of the glass in the tank in such a manner as to control both the convection and the created mechanical currents to promote a rapid melting and to reach the desired homogeneity in the melted glass in a shorter time period.

A more specific object of the invention is to provide means for mechanically accelerating the motion of the glass in the melting or other areas by the introduction of a fluid or bubble forming material or medium into the body of the molten glass in such areas. Preferably the bubbling material is introduced through the floor of the melter, thereby to generate a vertical plane of accelerated motion in the glass body causing thereby a more rapid approach to the desired homogeneity in the molten glass.

The vertical plane of motion causes a circular or elliptical convection current which not only improves homogeneity but moves the glass or batch from the colder portion of the furnace to the hotter portion, where it is exposed to the heat source, thus promoting more rapid melting. Depending on its location, the induced vertical plane of motion may be used to oppose an undesirable convection current which would normally be present without the bubblers.

A further object of the invention resides in the utilization of mechanical means acting within the mass of glass to facilitate movement of the glass and batch material from the colder portion of the furnace to the hotter portion thus promoting more rapid melting, and, in this connection to control batch distribution in the molten glass body by inhibiting its tendency to sink to the lower strata of glass in the furnace.

Other objects will be apparent from the following descriptive matter.

In the drawings:

FIG. 9 is a plan view of an end portion of a melting tank showing a single type batch feed as well as electrodes through the side walls of the tank.

FIG. 10 is a plan view of an end portion of a tank showing the opposed type batch feeding.

FIG. 11 is a schematic wiring diagram of the electrical circuit for the tanks shown in FIGS. 7 and 8.

FIG. 12 is a schematic wiring diagram of the electrical circuit for the center portion of the tank shown in FIG. 4.

FIG. 13 is a schematic wiring diagram of the electrical circuit for the tank shown in FIG. 3.

FIG. 14 is a part sectional elevational view showing the vertical location of the horizontal electrodes of the tank shown in FIG. 9.

Figure 16:
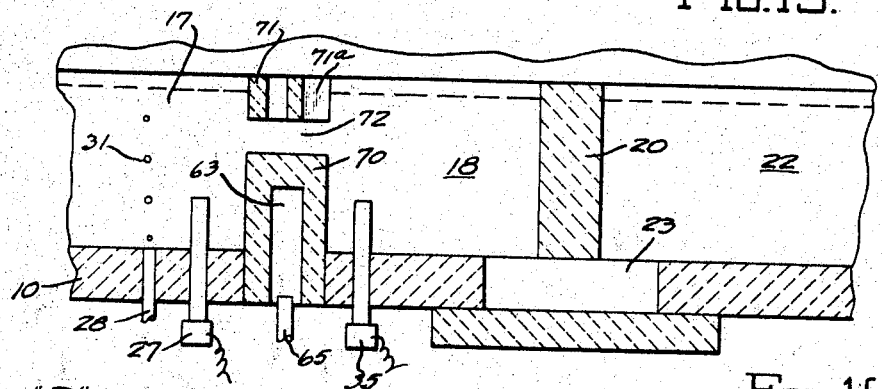

FIG. 16 also is a cross-sectional elevation taken at the longitudinal centerline of a tank showing a submerged opening through the dam.

Figure 17:
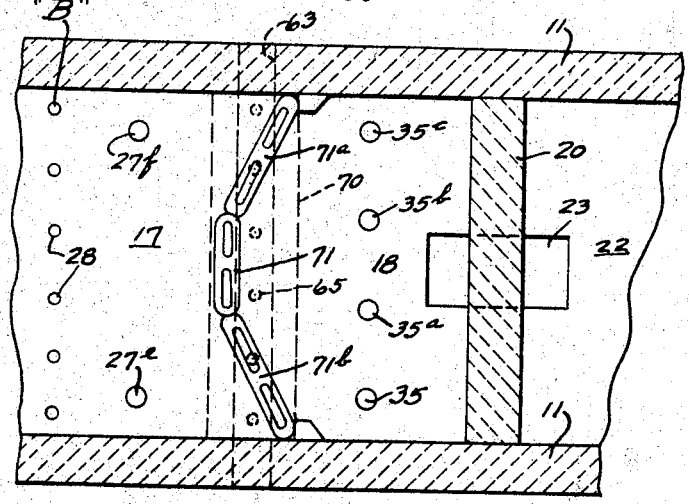

FIG. 17 is a plan view of the structure of FIG. 16 showing the relative arrangement of the dam, the bubblers and electrodes.

Figure 1:
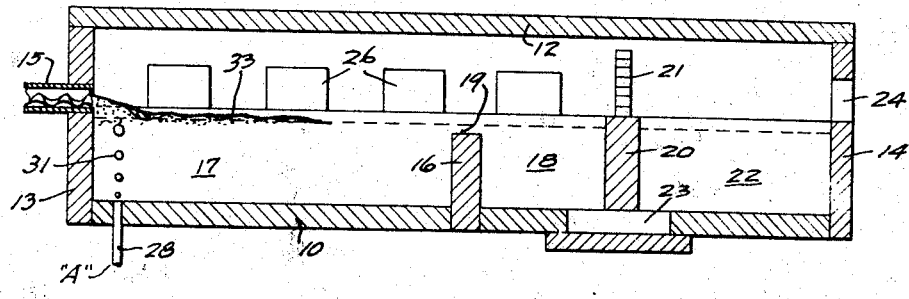
FIG. 1 is a longitudinal sectional elevation through a glass melting tank illustrating the combination of a submerged dam and bubblers.
Figure 2:
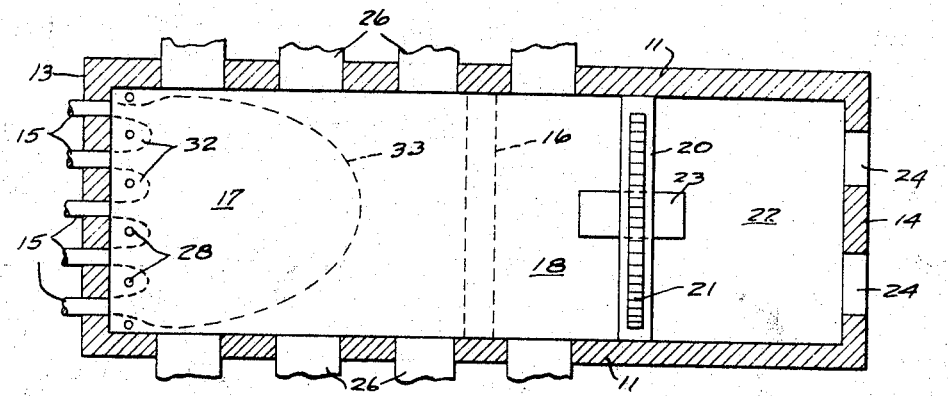
FIG. 2 is a plan view of the glass containing portion of a melting tank such as shown in FIG. 1.
Figure 3:
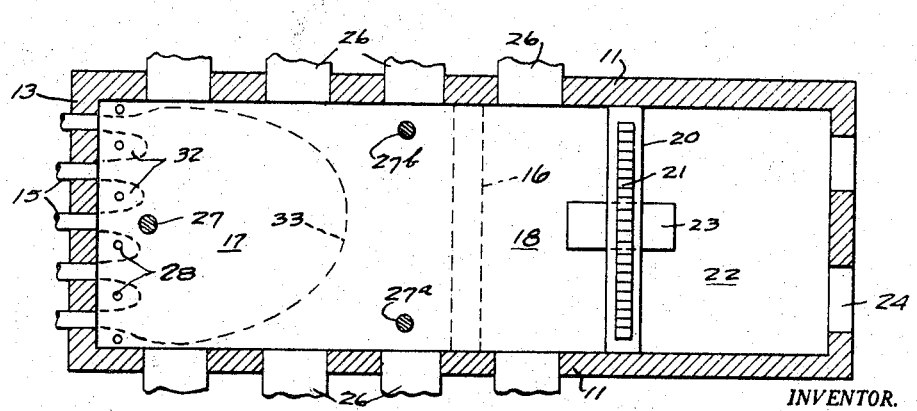
FIG. 3 is a plan view of a tank showing the addition of electrical equipment in equilaternal triangular form.
Figure 4:
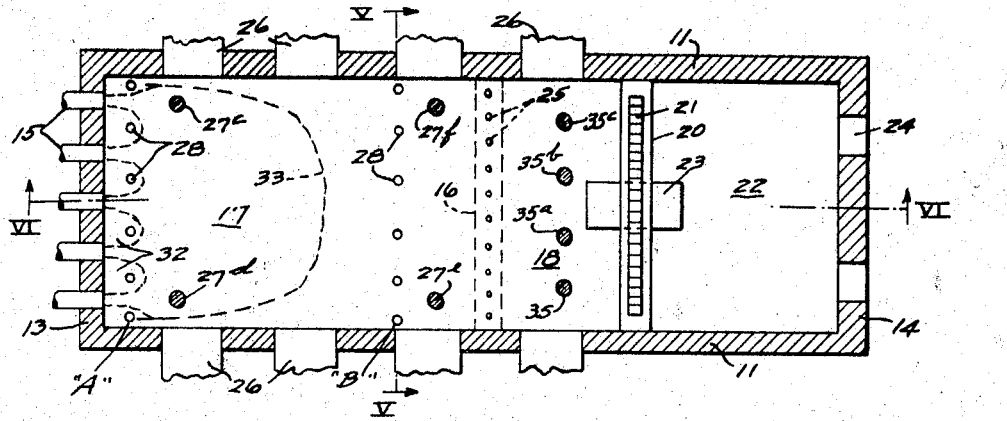
FIG. 4 is a plan view of a further arrangement of the temperature and current control members within a melting tank.
Figure 5:
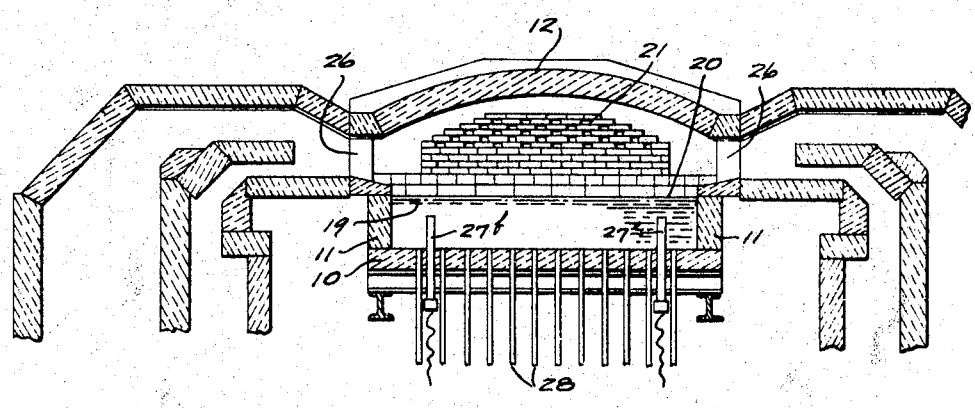
FIG. 5 is a cross-sectional elevation taken approximately at line V—V on FIGS. 4, 6, 7 and 8.

Referring to FIGS. 1–3, the tank, which may be generally of conventional construction, comprises a floor 10, side walls 11, a roof 12, and end walls 13 and 14, all made of refractory material. A submerged dam or bridge wall 16 separates the melting compartment 17 from the refining compartment 18, said compartments being in communication through the passage 19 extending above the submerged bridge wall 16. A series of pipes 25 supply cooling along the bottom of the dam 16 to thereby prolong its life use. A main bridge wall 20, with is complementary shadow wall 21, divides the refining and working compartments 18 and 22, respectively, but said compartments are in communication with each other through the passage 23 at the lower end of the bridge wall 20 and around the ends and over the top of shadow wall 21 as shown in FIGS. 4 and 5. Passage 23 may be at any desired vertical level through the wall 20 or of the drop-throat type as shown.

Figure 15:
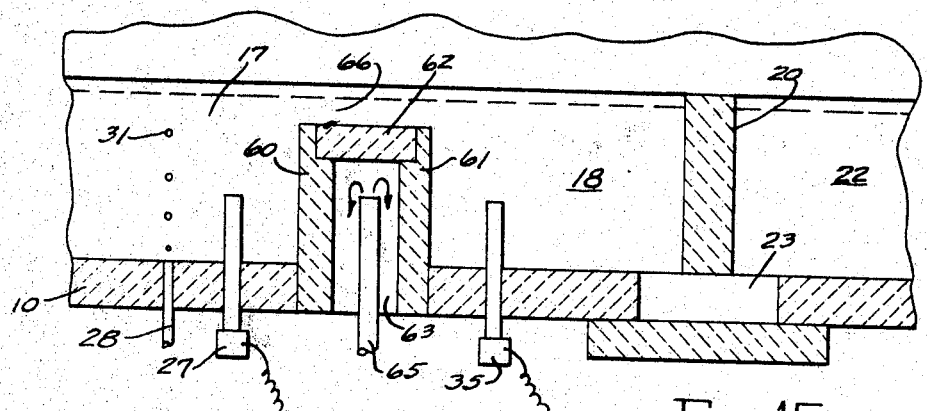
FIG. 15 is a cross-sectional elevational view taken on the longitudinal centerline of a tank showing a bridge-wall type structure as a dam.

Referring to FIGS. 15, 16 and 17, modifications of the structure of the dam 16 are shown. In particular the structure of FIG. 15 is important for several reasons. In this particular structure the submerged dam is comprised of vertical walls 60 and 61 with a cap block 62 forming thereby a hollow structure having an opening 63 therein which extends through the full width of the tank and which is open at the bottom and at both ends or sides of the tank.

Projecting up into opening 63 is a series of cooling pipes 65 which are adapted to blow cooling air upon the outer surface areas of the walls 60 and 61 and the cap block 62. This cooling is provided only to prolong the life of the blocks.

By providing this opening or gap 63 in this submerged dam, the electrical currents from electrodes 27 and 35 are prohibited from passage through the walls and are forced to travel through the molten glass and over the dam through passage 66. In particular is this true when a circuit is provided which involves the electrodes positioned upon opposite sides of the dam. A row of bubblers 28 is provided in front of the dam and the electrodes 27 to modify the convection currents in that area.

FIG. 17 illustrates the particular arrangement of the bubblers 28, the electrodes 27 and 35 and the dam 71 with respect to each other.

The electrical circuits with respect to the electrodes 27 and 35 may be other than a circuit which passes the electrical energy over or through the dam as will be set forth hereinafter.

The raw batch materials may be introduced through openings in either the end or sidewalls, but the means for introducing said material is here shown as batch feeders 15 in the end wall 13. These materials are melted and refined to some extent as they advance slowly through the compartment 17. The molten metal or glass then passes through the passage 19 above the submerged bridge wall 16 into the refining chamber 18 where it is further refined and conditioned before it is withdrawn or discharged to the working chamber 22. Work openings 24 are provided in the end wall 14 from which the molten refined glass may be taken in any of the known conventional manners.

A blanket of radiant heat for melting the glass is supplied from regenerators (not shown) from which hot gases are discharged through ports 26 which open into the melting compartment above the level of the glass, said ports being arranged at intervals along both sides of the furnace.

In addition to the blanket of radiant heat supplied through ports 26, there is provided a plurality of electrodes 27 which provide electrical heat in and through the mass of glass in the several glass containing compartments. These electrical elements also aid in the control and production of the convection currents engendered in the body of the glass as will be more fully disclosed hereinafter.

As a component part of the invention, there is provided a series of pipes 28 or lines which lead to and extend upwardly through the floor of the furnace and through which a fluid medium is discharged in the form of bubbles liberated at regulated and controlled intervals within the molten glass. These pipes may be of cast iron or other metal, alloy or refractory material resistant to the action of the molten glass and the high temperatures involved.

The fluid or gas as it flows upward through the pipe 28 forms a bubble 31 within the molten glass at the mouth of the tube, the size of the bubble being dependent primarily on the surface tension of the glass and in a measure on the shape of the tube or conduit at its discharge end. When the bubble reaches a certain size it will break loose from the end of the tube and commence to rise toward the surface of the glass. This upward movement of the bubble causes the comparatively viscous molten glass which envelops it to move upward therewith. This upward pull or movement of the glass may be confined mainly to that portion of the glass immediately adjoining the bubble.

The gas or fluid supplied by each pipe is liberated within the glass in a succession of bubbles 31 formed at intervals which may be controlled and regulated by regulating the pressure. These bubbles, which may be substantially spherical when released from the pipe 28, gradually expand as they rise and are also flattened out before they are discharged at the surface of the glass.

In the normal feeding of glass batch to the usual melting furnace, it will be found that the batch fills rather solidly down the end wall 13 to the bottom wall 10 and apparently the major portion thereof remains there or only small portions move slowly therefrom. Because of this condition this end and bottom portion runs comparatively cold. Such a condition can be obviated by and through the proper use of the bubblers 28 and regenerators (not shown) adapted to work in combination to provide both mechanical and convection current circulation as set forth hereinafter.

The pipes 28 are preferably arranged in rows A and/or B extending transversely of the furnace, these rows being at right angles to the general direction of movement of the glass through the furnace. One row of pipes A enters through the furnace floor at a position in front of and between and beneath each of the batch feeders 15. Row B enters through the furnace floor at a position before the submerged dam 16. It will be seen that with rows of pipes thus arranged and discharging gas bubbles at short intervals, there will be a continuous upward movement of these bubbles, all in a substantially vertical plane and distributed at short intervals throughout the area of the glass within such plane. Thus, there is mechanically produced a rising path of molten glass extending through the width of the tank and which is drawn upwardly with the gas bubbles. As a result the partially melted material which would ordinarily be sluggish or dormant, so far as travel along or adjacent to the bottom of the furnace may be concerned, is forced to move upward toward the top surface of the glass where the higher furnace temperature and greater fluidity of the glass allow a comparatively rapid release of the entrapped gases. Thus these unmelted or partially unmelted portions of batch material are subjected to the higher temperatures to materially aid in speeding the melting and fining process.

At the same time this movement of the glass in the form of a rising curtain serves to prevent a rapid and continuous movement of the surface glass and batch materials directly from the charging end of the furnace toward the fining chamber 18. The action is also such as to control the batch blanket 33 and keep it from prematurely sinking, yet prevent complete stagnation of the lower strata of glass in the furnace and insure the thorough mixing of the materials during the melting process while at the same time directing and supplementing the convection currents and preventing the formation of cords, streaks and other conditions which would result in lack of homogeneity in the final workable glass mass. This controlled circulation of glass in accordance with the present invention also accelerates the melting and refining operations and results in a substantial saving in fuel and an increased productive capacity.

The bubbles which are liberated within the glass may be comparatively large and will break upon reaching the surface of the glass. The particular type of fluid or gas used may vary, depending on whether it is desired to use an oxidizing, a reducing or a neutral gas for the purpose of reacting on the glass. For example, where the glass batch contains iron, an oxidizing gas may be used for oxidizing the iron. A reducing gas may be used to retain certain coloring compounds. A neutral gas may be employed where it is desired to avoid any changes in the state of the chemical contents comprised in the glass, and such gas may be supplied through pipes from a tank or reservoir in which the gas is stored under pressure although the invention is not to be considered as limited to the use of gas in this form. Gas-forming elements or compounds as, for example, air under pressure, water, ammonium nitrate, ammonium sulphate, sodium chloride, arsenic and other materials which readily form gaseous type bubbles, may be satisfactorily used where such materials are delivered under properly controlled condition.

The rate of flow of fluid or gas may be varied throughout a rather wide range. In commercial operations I have obtained satisfactory results with rates of flow ranging from as low as six bubbles per minute released from each line, up to 100 or more. The most satisfactory rate of flow depends upon variable factors met within the melting and fining operations such as size of the tank, depth of the glass, composition of the glass batch, temperature to which the glass is subjected during melting and fining as well as other factors.

Attention is directed to the row A of the bubbler pipes 28 and in particular to their location with respect to the individual batch feeders 15. It will be noted that these bubblers are so located that as the bubbles form and rise to the surface of the glass they appear on the surface in an area 32 of molten glass between each batch feeder. One purpose in having such an arrangement is to avoid any possible blowing of the dust of the batch mixture upwardly into the flame area of the tank, and thus cause rapid deterioration of the refractory members which would be exposed to such dust. These bubblers need not be located exactly midway between the batch feeders.

Referring in particular to FIGS. 1 and 2, there is disclosed therein the combination of bubblers 28, ports 26 and the submerged dam 16. With this particular combination, the batch materials are prevented from accumulating at the rear end wall 13 by the bubblers 28 and are forced to come up into the high temperature surface zone portion where they are more rapidly and individually subjected to such temperature. This will permit a more rapid melting of these materials because a greater activity in convection currents will exist through the length of the melter portion 17.

Because of this mechanical and convection current activation, the glass moving along the melter reaches a point of approximately complete fusion or melting in front of the dam 16, and because the top surface area is the hottest, then only the hottest melted glass will flow through passage 19 into compartment 18.

Although this above described combination does increase the tonnage melted, it is of course desirable to obtain the greatest tonnage possible per square foot of melter area. As a consequence, a combination such as just described but including additional heat supplied internally of the glass provides the means whereby the ultimate in homogeneity of the glass and in tonnage melted may be acquired.

For example, the combination of bubblers 28, ports 26, and dam 16, will provide the desirable increase in melting, motion and fining of the glass. With the row A of bubblers 28 positioned adjacent the end wall 13, a vertical plane of motion is caused in the melting glass and the batch is thus prevented from settling down along the end wall 13 and to the bottom of the furnace. This gives a much higher wall temperature on the bottom blocks and insures movement of the major portion of the batch and molten glass away from this end of the furnace.

This row of bubblers A (FIG. 3) provides a highly activated movement in the glass in this end of the furnace, this action being the result of the convection currents generated in the glass mass by the radiant heat of the ports 26 supplemented by the mechanical motion provided through the vertical plane of motion of the bubbles 31.

Because of this accentuated motion, all of the batch materials are more rapidly and in greater volume subjected to the radiant heat from the ports 26. This results in the melting of a given quantity of glass in a much shorter time period than is usual in a normal furnace structure and operation.

With the batch being fed to this end of the furnace by a series of feeders 15 there is thus effected what might be termed a blanket 33 of such batch mixture moving over the upper surface of the melting end of the furnace 17 and extending part way through the length of the melting portion of the furnace. In those instances where a single batch feeder 15 or a pair of batch feeders, such as illustrated in FIGS. 9 and 10 respectively, may be utilized it will also be found that the major portion of the batch tends to form small separate lumps or individual blankets 33. In such situations the current agitation produced by the bubblers 28 will hasten the melting down of the raw materials in such lumps or blankets 33.

As the molten mass enters into the compartment or chambers 18 (FIGS. 2 and 3), it may be then subjected to radiant heat and will be permitted to reach a condition of refinement which is free from bubbles. Subsequently the mass flows through the passage 23 into the working chamber 22 from which it is taken for processing through work openings 24.

With this above described arrangement of heating together with the bubblers at the batch feeding end, it is possible to operate at a productive capacity of approximately a ton of molten glass per 4.5 sq. ft. of melter area.

In the particular arrangement of FIG. 4, there are provided three zones of convection current activity between the point where the batch is fed into the furnace and where it enters into the working chamber as workable molten glass. At least two of these zones are supplemented by a mechanical gaseous means, namely, the rows A and B of bubblers 28, which accentuate the speed of motion of the glass in a vertical plane and through this means the temperature of the body or mass of glass in the compartments 17 and 18 becomes more nearly equalized and uniform throughout its depth, width, and length.

Figure 6:
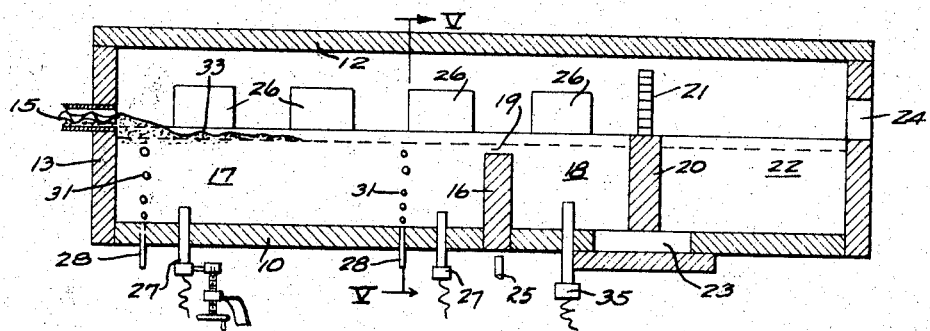
FIG. 6 is a longitudinal sectional elevation through a glass melting and fining tank embodying the novelties of this present invention.
Figure 7:
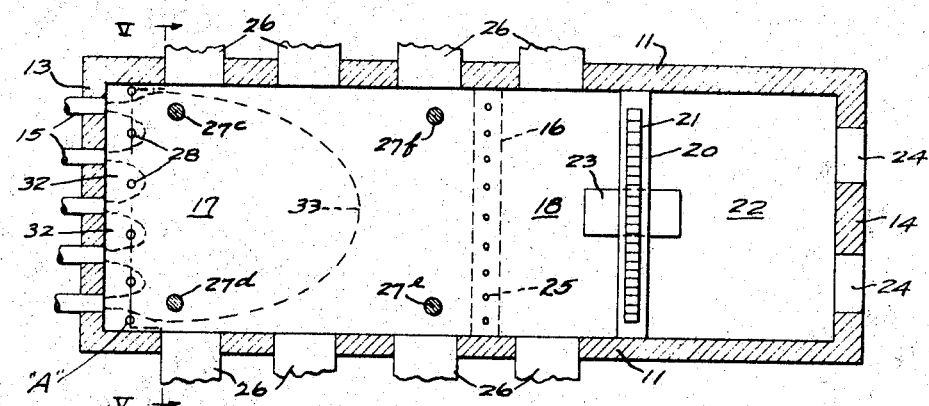
FIG. 7 is a plan view showing one arrangement of the members for controlling the current motion of the body of glass in a glass melting tank.
Figure 8:
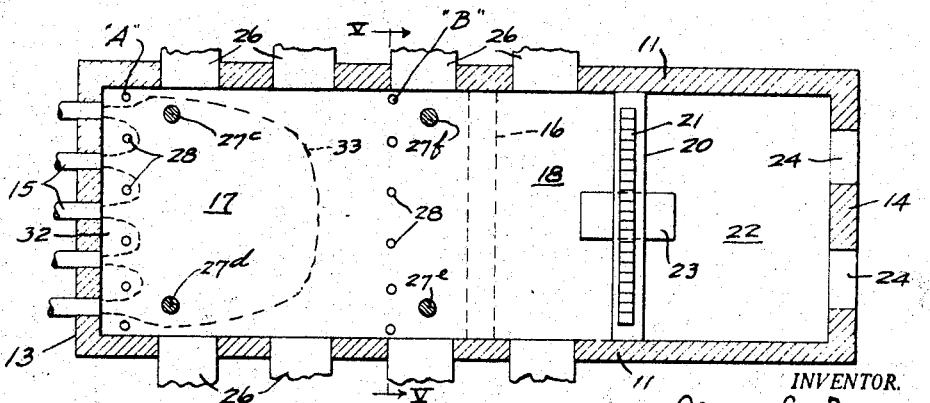
FIG. 8 is a plan view of a further arrangement of the members adapted to control the motion of the body of glass in a melting tank.

Thus, with the combination of bubblers, gas ports and electrodes as illustrated in FIGS. 4, 5, and 6, there is provided the ultimate in combining mechanical and convection current motion in the molten mass, and consequently all portions of the mass will more rapidly reach the maximum temperature and more rapidly bring the oxides into solution. Thus a greater tonnage withdrawal of melted and refined glass is obtainable in a minimum time interval. This arrangement permits the input of B.t.u. into the mass to be upon a basis in proportion with tonnage pull upon the furnace or tank, and to also increase the tonnage melted and worked per sq. ft. of melter area.

The terms "fluid" and "gas" as used herein are interchangeable in their scope and meaning as the use of either comprehends that the medium may be actually of fluid or gas form.

Modifications may be resorted to within the spirit and scope of my invention.

I claim:

1. In a glass producing furnace having a melting chamber for the continuous production of molten glass, which includes a rear end wall, opposite side walls and a bottom wall, plural radiant heat ports along said side walls above the molten glass in said chamber and spaced from said rear end wall, each said ports including burners for heating the glass and subjecting it to convection current agitation, batch feeding means along said rear end wall for feeding raw glass making material onto the surface of the molten glass adjacent the end wall of said chamber to produce a blanket of raw material on the molten glass, the improvement therein comprising gaseous bubbler means for introducing gaseous bubbles into the bottom region of the molten glass beneath the area of admission of the raw glass making materials so as to pass bubbles upwardly therein to the surface of the molten glass and create rising currents in the molten glass in a region thereof adjacent said end wall, said bubbler means comprising a bubbler mounted in said bottom wall and communicating with the molten glass in said chamber in a relatively closely spaced horizontal relation to said end wall compared with said horizontal spacing between said radiant heat ports and said end wall, and said bubbler underlying the immediate area of feeding the raw materials to said blanket, the rising currents of said molten glass inhibiting the tendency of the raw materials of said blanket to sink in the glass near said area of feeding same by creating predominantly upward currents in the molten glass in said area.

2. The furnace defined in claim 1, wherein said batch introducing means comprises a plurality of batch feeders spaced along said rear end wall, and said bubbler means comprises plural bubblers in said bottom wall disposed on opposite sides of said batch feeders so that the rising bubbles reach the surface of the molten glass in areas thereof spaced horizontally on opposite sides of each said batch feeder.

References Cited by the Examiner

UNITED STATES PATENTS

| 2,331,052 | 10/43 | Shadduck | 65—134 |
| 2,387,222 | 10/45 | Wright | 65—135 X |
| 2,512,761 | 6/50 | Arbeit | 65—342 X |
| 2,593,197 | 4/52 | Rough | 65—134 |
| 2,600,490 | 6/52 | De Voe | 13—34 |
| 2,909,005 | 10/59 | Beck et al. | 65—178 |
| 2,921,106 | 1/60 | Arbeit | 65—136 |

DONALL H. SYLVESTER, *Primary Examiner.*

IVAN R. LADY, WILLIAM B. KNIGHT, *Examiners.*